Aug. 22, 1967   A. EDWARDS   3,337,319
METHOD AND APPARATUS FOR PURIFYING THE MOLTEN
BATH OF A GLASS SHEET FORMING OPERATION
Filed Oct. 17, 1963                         3 Sheets-Sheet 1
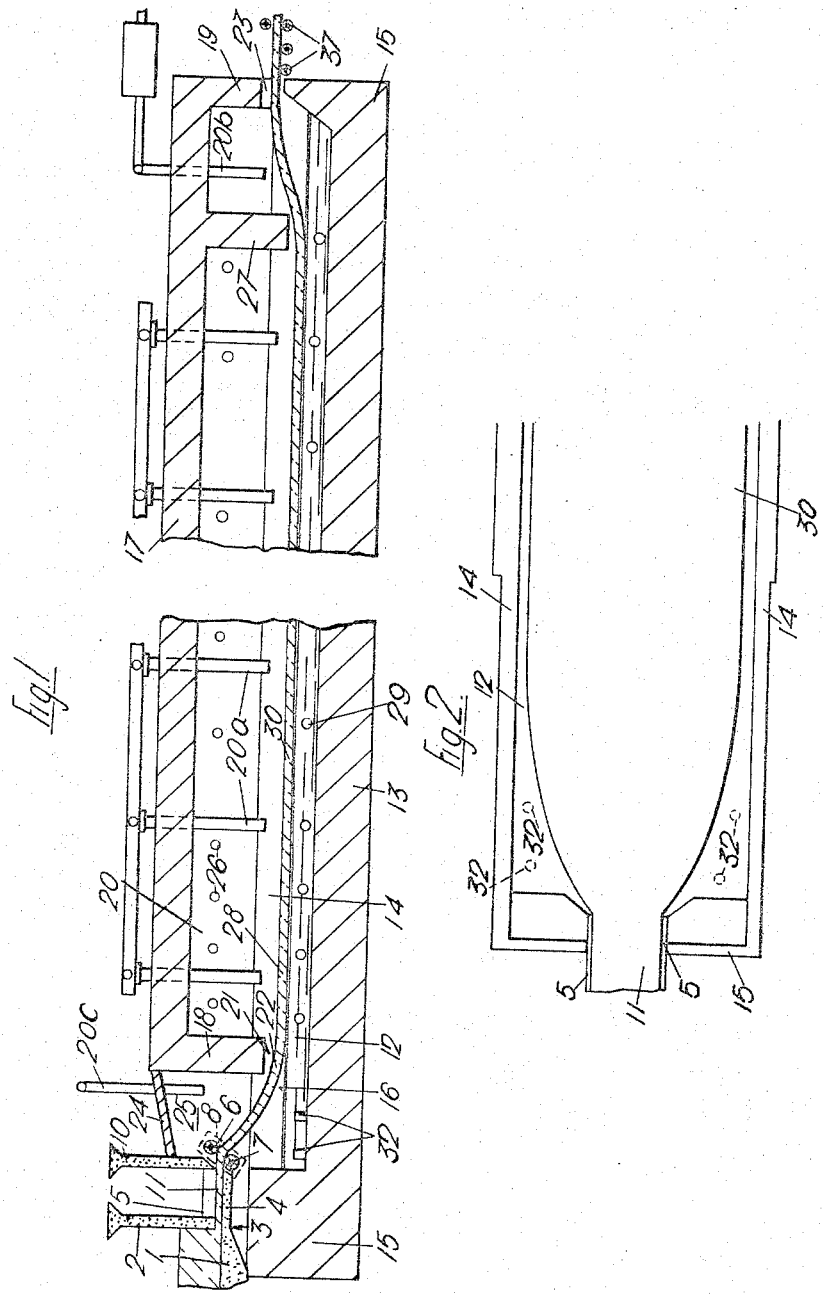
Inventor
Alan Edwards
By
Morrison, Kennedy & Campbell
Attorneys

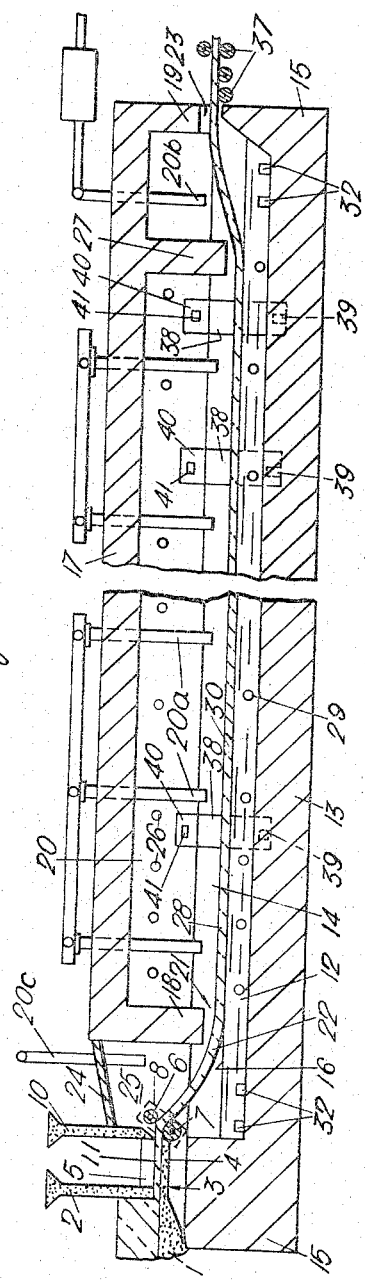

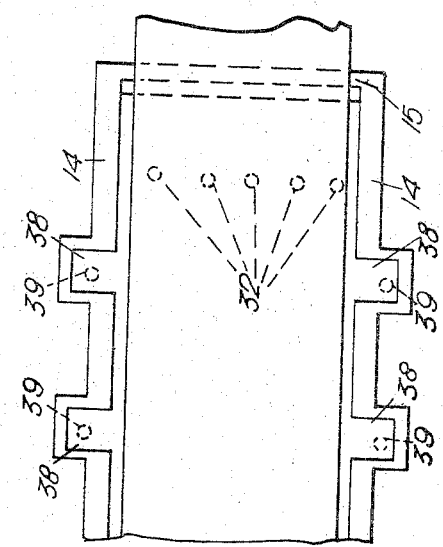
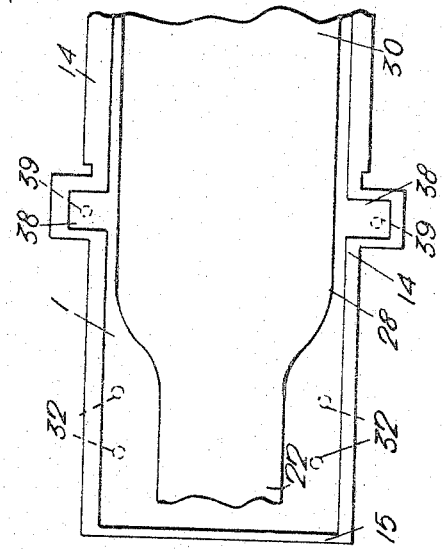

United States Patent Office 3,337,319
Patented Aug. 22, 1967

3,337,319
METHOD AND APPARATUS FOR PURIFYING THE MOLTEN BATH OF A GLASS SHEET FORMING OPERATION
Alan Edwards, Widnes, England, assignor to Pilkington Brothers Limited, Liverpool, England, a corporation of Great Britain
Filed Oct. 17, 1963, Ser. No. 316,868
9 Claims. (Cl. 65—27)

This invention relates to the manufacture of flat glass.

In the manufacture of flat glass in which glass is in contact with a molten metal, for example a method in which flat glass is manufactured in ribbon form on a bath of molten tin or tin alloy, it is known to protect the molten metal by maintaining over it a plenum of protective atmosphere. The molten metal with which the glass is in contact is such as to have all the characteristics as fully described in U.S. Patent No. 2,911,759 for the molten bath.

The protective atmosphere employed over the molten metal is constituted by a non-oxidising gas which is chemically inert to the molten metal, that is to say, a gas which will not chemically react to any substantial extent with the molten metal to produce contaminants of the glass.

However, even when a plenum of protective atmosphere is maintained over the molten metal, it is found that very small quantities of impurities, for example oxygen, do come into contact with the molten metal and form contaminants for the glass at the surface of the molten metal. One of the ways in which these traces of impurities reach the surface of the molten metal is from the body of the molten metal itself, for example traces of oxygen may enter the molten metal from the glass which is in contact with the molten metal.

Accordingly it is a main object of the present invention to provide an improved method of manufacturing flat glass during which glass is in contact with a molten metal and in which the formation of contaminants for the glass is inhibited.

In accordance with the present invention, this object is achieved by contacting the molten metal with a gas which is chemically inert to the molten metal and thereby inducing impurities in the molten metal to vaporise.

More particularly in accordance with the present invention there is provided, in the manufacture of flat glass during which the glass is in contact with a molten metal, the step of introducing into the molten metal a gas which is chemically inert to the molten metal, to remove impurities from the molten metal.

The impurities which may be present in the molten metal, for example oxygen, are in general impurities which will in time vaporise from the molten metal at the temperatures at which the molten metal is employed in the manufacture of flat glass. The methods according to the present invention are methods which produce an acceleration of this vaporisation of the impurities by means of the relative movement between the gas which is chemically inert to the molten metal and the molten metal itself.

According to a preferred feature of the present invention the gas which is chemically inert to the molten metal is bubbled through the molten metal, thereby removing impurities from the molten metal.

In the case when the gas is bubbled through the molten metal, the removal of impurities from the molten metal may be regarded as an improved vaporisation of the impurities resulting from the increased surface contact between the body of the molten metal and the gas itself, so that the bubbles of gas collect any traces of vaporised or gaseous impurity such as oxygen or sulphur with which they may come into contact and remove them from the molten metal. The gradual migration of the impurities until they reach the surface of the molten metal where they may react to form contaminants for the glass is thereby avoided.

In one embodiment of the invention in which glass is advanced in ribbon form over a bath of molten metal the gas is introduced into the molten metal at both the inlet and the outlet ends of the bath, although gas may be additionally introduced into the molten metal bath at intervals throughout the length of the bath, provided that the gas is introduced at a distance from the ribbon of glass so that the gas arising from the molten metal does not come in contact with the glass on the bath.

In alternative arrangements in accordance with the invention, pockets of molten metal may be formed in the bath and out of the main body of the bath and the gas may be introduced into the molten metal in the pockets. According to this aspect, therefore, the present invention provides in the manufacture of flat glass in ribbon form during which the glass is advanced over a bath of molten metal, defining a pocket of the molten metal in the bath and introducing into the molten metal in the pocket a gas which is chemically inert to the molten metal so that the gas bubbles through the molten metal in the pocket and removes impurities from the molten metal, whereby the level of impurities in the molten metal of the bath is reduced.

If desired, the depth of the molten metal in the pocket may be greater than the main depth of the molten metal on which the glass is advanced so that the surface contact effected between the gas and the molten metal is increased.

Advantageously the gas is preheated to a temperature near the temperature of the molten metal which it is to purify, for example the gas may be heated to a temperature of about 600° C.

It will be understood that the introduction of gas into the molten metal accelerates the vaporisation of metal compounds formed from impurities in the molten metal. The vapourised metal compounds which are formed are removed with the atmosphere over the molten metal.

In the particular case where the molten metal comprises a bath of molten tin the present invention provides in the manufacture of flat glass in ribbon form during which the glass is advanced over a bath of molten tin, accelerating the vaporisation of tin compounds formed from impurities in the tin by introducing into the molten tin a gas which is chemically inert to the molten tin so that the gas bubbles through the molten tin.

In the co-pending application of Charles Ronald Taylor Ser. No. 316,853, filed Oct. 17, 1963, there is described an arrangement in which the protective atmosphere over the molten metal comprises a major proportion of a gas such as nitrogen or argon, which is inert or substantially inert to the molten metal, and a proportion of a reducing gas such as hydrogen which will react with any oxygen present in the protective atmosphere. In the case when a protective atmosphere in accordance with this co-pending application is used, it is convenient that the gas which is introduced into the molten metal is one of the gases which is maintained in the protective atmosphere.

Advantageously the gas which is used according to the present invention is a mixture of nitrogen and hydrogen. When hydrogen is introduced into the molten metal, for example in a mixture of nitrogen and hydrogen which bubbles through the molten metal, it will have an additional effect in removing impurities from the molten metal to that which has already been mentioned, arising from the movement of the gas mixture including the hydrogen through the molten metal, because the hydrogen will preferentially react with impurities such as oxygen or sulphur in the molten metal to form with the impurities compounds which are more stable than the compounds formed by those impurities reacting with the molten metal of the bath. Accordingly the employment of hydrogen as a constituent of the gas which is introduced into the molten metal has an additional effect in inhibiting formation of contaminants for the glass at the surface of the molten metal.

Alternatively, however, the gas which is introduced into the molten metal may be nitrogen alone or argon alone, if argon is used in the protective atmosphere, or hydrogen alone. As further alternatives mixtures of argon and hydrogen or argon and nitrogen or nitrogen, argon and hydrogen may be used.

The present invention further comprehends apparatus for producing flat glass in ribbon form comprising in combination a tank structure including side and end walls, said tank structure containing a bath of molten metal, a roof structure including corresponding side and end walls erected over the tank structure, an inlet for admission of glass to the bath and an outlet for discharge of glass in ribbon form from the bath and, within the tank structure, gas injection means for introducing into the bath of molten metal in the tank a gas which is chemically inert to the molten metal.

Conveniently the tank structure further includes a pocket formed in each side wall of the tank structure, each pocket containing the molten metal and gas injection means for introducing the said gas into the molten metal in the pocket.

In order that the invention may be more clearly understood, some embodiments thereof will now be described, by way of example, with reference to the accompanying drawings in which:

FIGURE 1 is a sectional elevation of apparatus according to the invention comprising a tank structure containing a bath of molten metal, a roof structure over the tank structure and apparatus for delivering a rolled ribbon of glass at a controlled rate onto the bath surface, FIGURE 2 is a plan view of the inlet end of a tank structure showing a different arrangement from that of FIGURE 1, FIGURE 3 is a sectional elevation of an alternative embodiment of apparatus according to the invention showing a preferred arrangement for contacting the molten metal with the gas, and FIGURE 4 is a plan view of the tank structure according to FIGURE 1.

In the drawings, like reference numerals designate the same or similar parts.

Referring to the drawings, a forehearth of a continuous glass melting furnace is indicated at 1, a regulating tweel at 2 and a spout at 3. The spout 3 comprises a lip 4 and side jambs 5 which form with the lip a spout of generally rectangular cross-section. A cover is secured over the spout 3 in well-known manner.

Operatively associated with the spout 3 are a pair of water-cooled casting rolls 6 and 7 which are mounted in side frames 8 and are driven through toothed wheels by power means, not shown.

A gate 10 is adjustably supported in a vertical plane in continuity with the upper casting roll 6. The gate 10 shields the roll 6 from heat radiated from the molten glass 11 flowing from the forehearth 1 over the lip 4 of the spout 3 to the pass between the casting rolls 6 and 7.

The upper casting roll 6 is disposed slightly in advance of the lower casting roll 7 so that the molten glass 11 flows from the lip 4 onto the upper part of the roll 7 which thus presents to the glass 11 a downwardly and forwardly directed arcuate casting bed moving in the same direction as the direction of flow of the glass 11 along the spout. Thus the molten glass 11 on leaving the spout 3 is constrained to flow forwardly, thereby preventing backward flow of molten glass under the spout 3.

The ribbon forming means comprising casting rolls 6 and 7 just described is disposed over one end of a tank structure which contains a bath 12 of molten metal, for example molten tin or a molten tin alloy in which tin predominates. The tank comprises a floor 13, side walls 14 and end walls 15. The side walls 14 and end walls 15 are integral with each other and with the floor 12. The level of the surface of the bath 12 of molten metal is indicated at 16.

The tank structure supports a roof structure bridging the bath and including a roof 17, end walls 18 and 19, and side walls 20, so that the roof structure provides a tunnel over the bath 12, and defines a headspace over the bath. An outlet 23 is defined by the end wall 19 of the roof structure, and the end wall 15 of the tank structure, and a cooled ribbon of glass is taken unharmed from the bath through the outlet 23.

The roof structure also includes an intermediate wall 27 situated near the outlet end of the bath, so that the headspace over the bath is divided into a main or central headspace between the end wall 18 and the intermediate wall 27, and a similar headspace or chamber between the intermediate wall 27 and the end wall 19. A protective atmosphere maintained at a plenum is fed into the main or central headspace through the ducts 20a, which are connected to a header outside the roof structure, the ducts 20a extending downwardly through the roof 17.

A protective atmosphere is supplied to the smaller headspace or chamber between the intermediate wall 27 and the end wall 19 of the roof structure by a duct 20b, which extends downwardly through the roof 17. The intermediate wall 27 thus separates from the main headspace over the bath an outlet region in which a protective atmosphere different from that in the main headspace may be maintained.

The end wall 18 at the inlet end of the tank extends downwardly into the tank structure, and defines an inlet 21 through which a formed ribbon of glass 22 is delivered by the casting rolls 6 and 7 on to the bath. An extension 24 of the roof is provided and forms, with the gate 10 and the end wall 18 of the roof structure, a chamber enclosing the casting rolls 6 and 7. This chamber further comprises side walls 25 which are carried by the side walls 14 of the tank. A protective atmosphere is fed into this chamber in the inlet region of the bath through the duct 20c.

In the embodiment of the invention described herein by way of example, temperature regulators, shown as heaters 26, are mounted in the roof over the bath and further temperature regulators shown as heaters 29 are mounted in the bath. The temperature gradient down the bath is so regulated that the ribbon of glass leaving the bath through the outlet has flat parallel surfaces which have a lustre of a fire-finish quality. These characteristics of the glass leaving the bath are achieved either by superficial melting of the surfaces of the glass as it is advanced along the bath or by maintaining the temperature of the bath at the inlet end at at least about 1,000° C., so that a molten layer 28 of glass is formed from the ribbon 22, this layer being maintained molten for a sufficient distance down the bath to permit the development of a buoyant body 30 of molten glass. The buoyant body 30 of molten glass is continually advanced in ribbon form along the bath and is cooled as it is advanced until at the outlet end of the bath where the temperature is about 600° C. the ribbon can be taken unharmed from the bath by driven rollers 37 disposed at the outlet end of the tank and slightly above the level of the bottom of the outlet 23 from the bath.

Extending through the floor 13 of the tank structure are inlet passages 32 through which gas inert to the metal comprising the bath 12 of molten metal is introduced so that the gas bubbles through the molten metal of the bath 12 from the inlet passages 32. The gas which is introduced through the inlet passages 32 may, for example, be one of the constituents of the gas mixture comprising the protective atmosphere, for example hydrogen. Advantageously there are provided exhausts for removing gas from the headspace in the vicinity of each of the points at which gas is bubbled through the molten metal from the inlet passages 32.

There is shown in FIGURE 2 an alternative method of delivering molten glass to the bath 12 of molten metal, the molten glass being delivered so that it has a free fall of a few inches from the spout 3; the molten glass then flows forwardly onto the bath 12 on which the glass is advanced.

There are also shown in FIGURE 2 inlet passages 32 and as an alternative to the introduction of the mixture of gases forming the protective atmosphere over the bath, it is possible for the component gases forming the protective atmosphere to be supplied separately, for example the hydrogen being caused to enter the headspace over the bath by being bubbled through the molten metal of the bath 12 from the inlet passages 32, while the nitrogen may be supplied through the duct 20c.

In practice the quantity of hydrogen delivered from the inlet passages 32 will be slightly more than the quantity required in the protective atmosphere. This is because the hydrogen which actually enters the headspace in the inlet region will be less than the hydrogen passing into the molten metal of the bath from the inlet passages 32 as some of the hydrogen passing through the molten metal of the bath will react with impurities, for example oxygen, which may be present in the molten metal of the bath.

Referring to FIGURES 3 and 4 of the drawings, there is shown a tank structure generally similar to that of FIGURE 1.

Formed in the side walls 14 of the tank structure are a series of pockets 38. In each of these pockets 38 there are provided a plurality of gas injection means 39 by means of which a gas may be introduced into the molten metal. Gas injection means 32 are also provided in the molten metal bath 12 near the end walls 15 which constitute the inlet and outlet regions of the bath.

The tank structure of FIGURES 3 and 4 supports a roof structure similar to that of FIGURE 1, but the side walls 20 of the roof structure of FIGURE 3 include pockets 40 corresponding to the pockets 38 in the side walls of the tank structure and these pockets 40 include exhausts 41 through which gas is removed from the headspace over the bath.

During the formation of the glass ribbon which is removed from the outlet 23 of the bath, which ribbon has flat parallel surfaces and a lustre of a fire-finish quality, a mixture of nitrogen and hydrogen containing for example four parts by volume of nitrogen to each part of hydrogen is continuously introduced into the molten metal of the bath through the gas injection means 32 and 39. The gas mixture which is thus introduced bubbles through the molten tin at the inlet and outlet regions of the bath at distances along the bath which are respectively before the glass comes into contact with the bath and after the produced glass ribbon has been removed from the surface of the bath. During the passage of the glass along the bath, during which passage the glass ribbon is formed from the molten layer 28 of glass and the buoyant body 30 of glass, the gas mixture is being continuously bubbled through the molten tin in the pockets 38 in the side walls 14 of the tank structure. The impurities which may be present in the molten tin in these pockets are thereby removed and pockets of purer tin are produced along the length of the bath. The purer tin from the pockets 38 diffuses into the main body of molten tin comprising the bath 12 so that the molten tin is kept clear of impurities and the formation of contaminants for the glass at the surface of the molten tin is inhibited. The passage of the gas mixture through the molten tin, however, is carried out at places which are chosen so that the gas will not come into direct contact with the glass on the bath.

The gas mixture which is introduced into the molten tin to bubble through the molten tin at the inlet region of the bath will be at such an elevated temperature that the hydrogen in the mixture will react with at least a proportion of the impurities such as oxygen and sulphur in the molten tin with which it comes into contact. At the outlet region of the bath, however, the hydrogen in the gas mixture which is introduced into the molten tin will be at a lower temperature of the order of 600° C. so that the hydrogen will not react to the same extent with impurities which it may meet, but these impurities will be carried off in the gas mixture and will be removed from the outlet region of the bath through the outlet 23.

Similarly the gas mixture which enters the headspace over the pocket 38 and in the pockets 40 contains impurities such as oxygen and sulphur and reaction products with these impurities will be removed through the exhausts 41 in the pockets 40 of the roof structure.

When a mixture of nitrogen and hydrogen is passed through the molten tin as just described with reference to FIGURE 3, processes of vaporisation of impurities and of reduction of impurities both occur. It is thought that the reduction process is the more important at the inlet end of the tank where the temperature is highest, while the vaporisation process is more important at the outlet or colder end of the tank.

The depth of the pockets 38 in the side walls of the tank structure is greater than the depth of the molten tin comprising the bath 12 as is indicated by the dotted lines 42 in FIGURE 1, thus affording a longer residence time for the removal of the impurities.

The protective atmosphere which is fed into the respective regions forming the main headspace and the inlet and outlet regions preferably comprises a majority of nitrogen with a small percentage of hydrogen. For example there may be 95% of nitrogen and 5% of hydrogen in the inlet and outlet regions 14 and 15 and 99.5% of nitrogen and 0.5% of hydrogen in the protective atmosphere in the main headspace 13.

As an alternative to the arrangement of gas injection means 39 in the pockets 38, the molten tin, after it has entered the pocket, may be caused to fall down a column, for example as a film or as droplets, to present a large surface area to an upwardly moving stream of gas. The purer tin from the foot of the column is then recirculated to the bath.

By the use of the embodiments of the invention described, the ingress of uncombined oxygen into the headspace over the bath via the molten metal of the bath is reduced.

Glass produced by the method according to the present invention has all the advantages of a fire-finish quality and freedom from distortions such as occur in the known rolling or drying methods.

This invention further comprehends flat glass produced by the method according to the invention and sheet glass cut therefrom.

I claim:

1. In the manufacture of flat glass in ribbon form during which the glass is advanced over a bath of molten metal, defining a pocket of the molten metal of the bath at one side the path of travel of the glass ribbon and bubbling through the molten metal in the pocket a gas which is chemically inert to the molten metal and inducing volatilisation of impurities from the molten metal into the bubbles to be carried thereby away from the molten metal in the pocket, whereby the level of impurities in the molten metal of the bath is reduced.

2. In the manufacture of flat glass during which the glass is advanced in ribbon form over a bath of molten tin, accelerating the vaporisation of tin compounds formed from impurities in the tin by introducing into the molten tin in zones between the sides of the bath and the edges of the ribbon of glass along both sides of the path of travel of the glass a gas which is chemically inert to the molten tin so that the gas bubbles through the molten tin and into the atmosphere above the surface of the molten tin.

3. In the manufacture of flat glass during which glass is advanced in ribbon form along a bath of molten metal, bubbling upwardly through a region of the bath not supporting the glass a gas which is chemically inert to the molten metal and thereby inducing impurities in the molten metal to vaporize from the molten metal into the bubbles adjacent the path of travel of the ribbon of glass and be carried by said bubbles clear of the glass/metal interface into the headspace over the bath.

4. A method according to claim 3 wherein the gas is a mixture of nitrogen and hydrogen.

5. A method according to claim 3 wherein the gas is nitrogen.

6. A method according to claim 3 wherein the gas is hydrogen.

7. Apparatus for producing flat glass in ribbon form comprising in combination a tank structure including side and end walls, said tank structure containing a bath of molten metal, a roof structure including corresponding side and end walls erected over the tank structure, an inlet for admission of glass to the bath and an outlet for discharge of glass in ribbon form from the bath and in the floor of the tank structure adjacent the tank side walls, gas injection means for supplying and introducing into the bottom of the bath of molten metal in the tank a gas which is chemically inert to the molten metal, and for bubbling said gas upwardly into zones between the tank walls and the edges of the ribbon of glass alongside the path of travel of the glass along the bath, whereby the gas bubbles through the upper surface of the bath into the atmosphere overlying the bath.

8. Apparatus for producing flat gas in ribbon form comprising in combination a tank structure including side and end walls, said tank structure containing a bath of molten metal, a roof structure including corresponding side and end walls erected over the tank structure, an inlet for admission of glass to the bath and an outlet for discharge of glass in ribbon form from the bath and, in the floor of the tank structure adjacent the tank side walls, gas injection means for supplying and introducing into the bottom of the bath of molten metal in the tank, alongside the path of travel of the glass along the bath, a gas which is chemically inert to the molten metal, wherein the tank structure further includes a pocket formed in each side wall of the tank structure, each pocket communicating with the main tank structure and containing molten metal of the bath, and gas injection means in the bottom of each said pocket.

9. In the manufacture of flat glass during which the glass is advanced in ribbon form over a bath of molten metal, bubbling upwardly through the molten metal of the bath laterally of and longitudinally along a region of the bath supporting the ribbon of glass a gas which is chemically inert to the molten metal and thereby inducing impurities to vaporise from the molten metal into the bubbles and be carried clear of the glass/metal interface adjacent the path of travel of the ribbon of glass.

References Cited

UNITED STATES PATENTS

| 1,816,742 | 7/1931 | Queneau | 75—85 |
| 3,241,937 | 3/1966 | Michalik et al. | 65—65 |

DONALL H. SYLVESTER, *Primary Examiner.*

S. LEON BASHORE, *Examiner.*

A. D. KELLOGG, *Assistant Examiner.*